April 12, 1938.  G. E. ATKINS  2,113,869

REGULATING APPARATUS AND SYSTEM

Filed March 25, 1936  3 Sheets-Sheet 1

INVENTOR
G. E. ATKINS
BY
Rudolph J. Gunther
ATTORNEY

April 12, 1938.　　　　G. E. ATKINS　　　2,113,869
REGULATING APPARATUS AND SYSTEM
Filed March 25, 1936　　　3 Sheets-Sheet 2

INVENTOR
G. E. ATKINS
BY
*Rudolph J. Gunther*
ATTORNEY

April 12, 1938.　　　　G. E. ATKINS　　　　2,113,869
REGULATING APPARATUS AND SYSTEM
Filed March 25, 1936　　　3 Sheets-Sheet 3
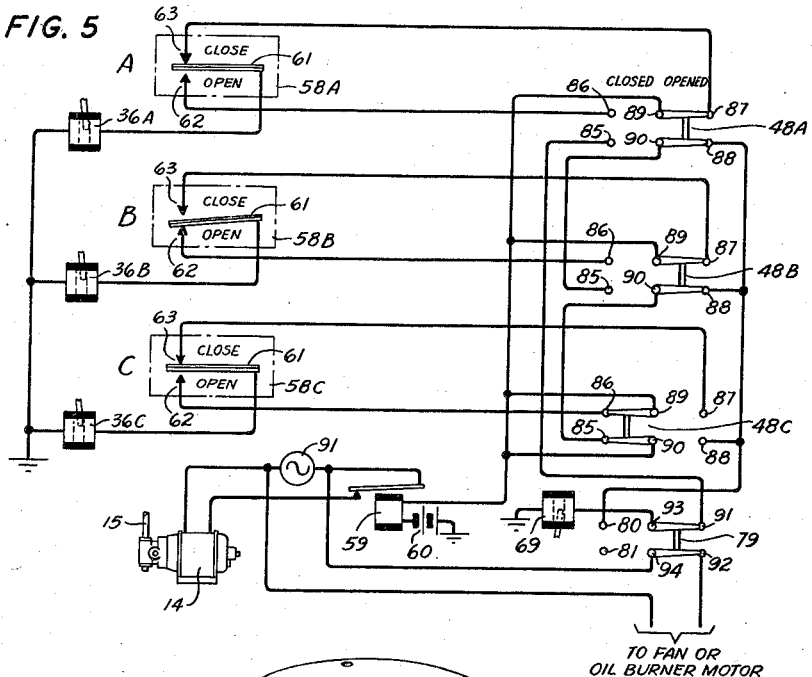
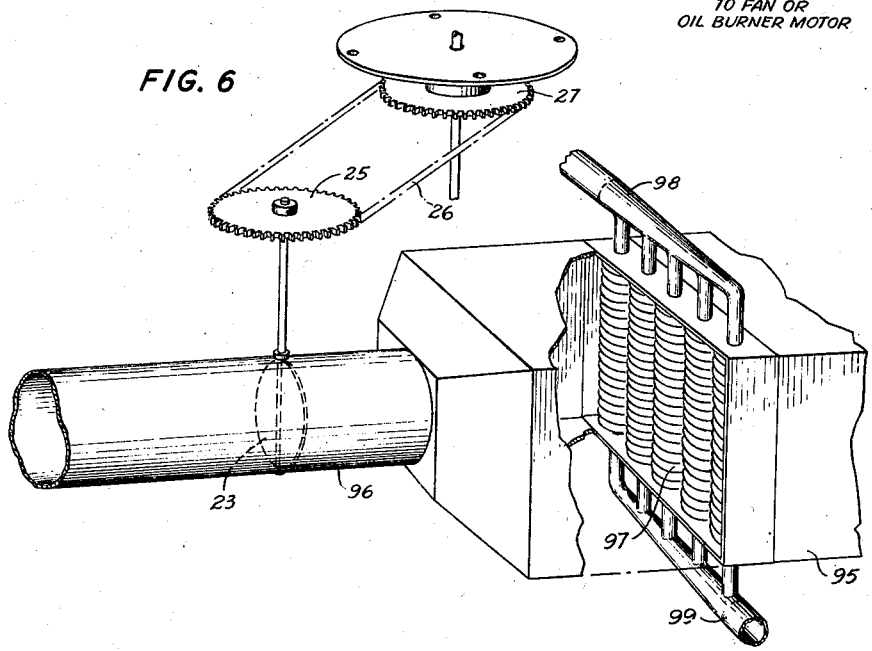
INVENTOR
G. E. ATKINS
BY
ATTORNEY Patented Apr. 12, 1938

2,113,869

UNITED STATES PATENT OFFICE 2,113,869

REGULATING APPARATUS AND SYSTEM

George E. Atkins, Glen Ridge, N. J., assignor of one-half to Alexander I. Abrahams, New York, N. Y.

Application March 25, 1936, Serial No. 70,786

17 Claims. (Cl. 236—11)

This invention relates to regulating apparatus and systems and more particularly to regulating apparatus for controlling conditioned air systems of the type wherein heated, cooled or humidified air is supplied to a plurality of rooms from a central plant.

One object of this invention is to control automatically the supply of heated, cooled or humidified air from a central plant individually to a plurality of rooms whereby the rooms will be maintained at desired temperatures.

Another object of this invention is to control automatically the operation of a central plant so that when the atmosphere at all of the rooms supplied thereby is at a desired condition, the energy or fuel consumed at the plant will be at a minimum.

A further object of this invention is to simplify electrically operated automatic control systems for heating, cooling and humidifying systems whereby the requisite wiring will be made small and the installation thereof expedited.

Still another object of this invention is to simplify actuating apparatus for a plurality of control members for heating, cooling and humidifying systems whereby a relatively small installation and maintenance cost will be assured.

The invention may be utilized, for example, in a heating system of the hot air type including a furnace having the usual draft and check, and a plurality of pipes or conduits extending from the furnace to registers or radiators located, for example, one in each of a plurality of rooms in a building. The pipes or conduits are provided with valves such as the usual rotatable dampers for controlling the flow of air therethrough.

In accordance with one feature of this invention, an actuating member is provided for each of the dampers, each of the members being operable automatically in response to temperature variations in the corresponding room, to rotate the damper associated therewith, whereby the flow of air to the several rooms may be regulated individually. The operation of each of the actuating members is affected, for example, through a control circuit including a thermostat or other temperature responsive device.

In accordance with another feature of this invention another actuating mechanism is provided for the draft and check of the furnace, this member being operable to open the draft and close the check when any one or more of the rooms is below a desired temperature and to close the draft and open the check when all of the rooms are at the desired temperatures.

In accordance with a further feature of this invention, the several actuating members are driven by a single power device, such as a motor, means being provided for automatically and individually coupling the actuating members to the power device and uncoupling the members therefrom.

In accordance with still another feature of this invention the coupling means are controllable through the aforesaid control circuits including the temperature responsive devices and the several control circuits are associated so that a minimum of electrical wiring is required.

The invention and the foregoing and other features thereof will be understood more clearly and fully from the following detailed description with reference to the accompanying drawings in which:

Fig. 5 is a diagrammatic view of a system illustrative of one embodiment of this invention showing the association of the control circuits for the heating plant and for the plurality of actuating members in the unit shown in Fig. 1; and Fig. 6 is a view in perspective illustrating an embodiment of this invention in systems having a radiation type heating or cooling plant.

Figure 1:
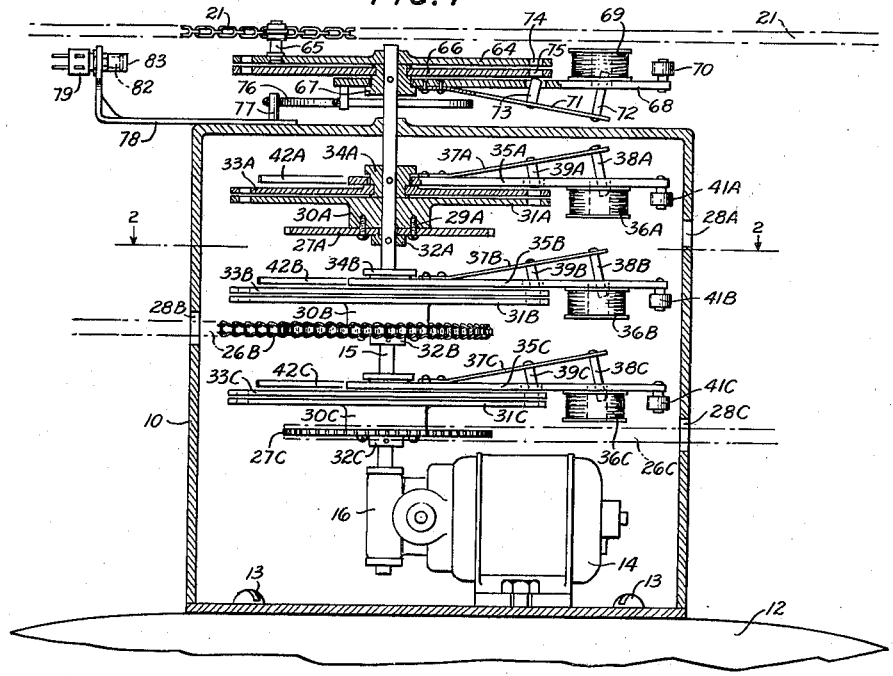
Fig. 1 is an elevational view, partly in cross section, of a unitary actuating unit, constructed in accordance with this invention, for controlling the supply of conditioned air to each of a plurality of rooms and for controlling also the heating or cooling plant.

In the drawings, the invention is illustrated as embodied in a regulating system for a plant supplying conditioned fluid to three rooms, which are referred to as A, B and C. The apparatus associated with each room and the supply conduit therefor is identified by a numeral followed by a corresponding one of the letters A, B and C. Inasmuch as various elements of the apparatus are identical, in the description, where feasible, similar elements are referred to generically only by the designating numeral without the specific letter.

Figure 2:
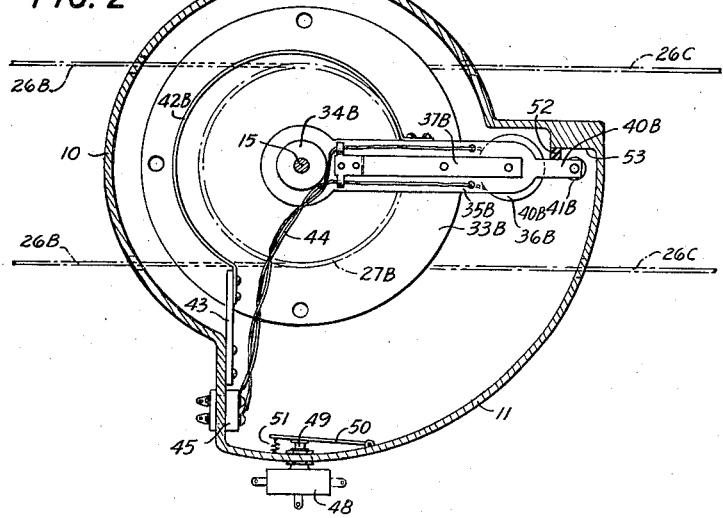
Fig. 2 is a view in cross section of the actuating unit along line 2—2 of Fig. 1.

Referring now to the drawings, the temperature regulating apparatus shown therein includes a unitary actuating assembly which, as shown in Figs. 1 and 2, comprises a housing having a body portion 10 and an arcuate portion 11 coaxial with the body portion 10. The housing may be affixed to a heating or cooling plant, such as a hot air furnace 12, by machine screws 13. Enclosed by the housing is a power unit such as a motor 14, which preferably is of the constant speed unidirectional type. The motor 14 drives a shaft 15 through a reduction gear chain, designated generally as 16, the gearing being such that the shaft 15 revolves at a speed of the order of 1 to 3 R. P. M.

Figure 3:
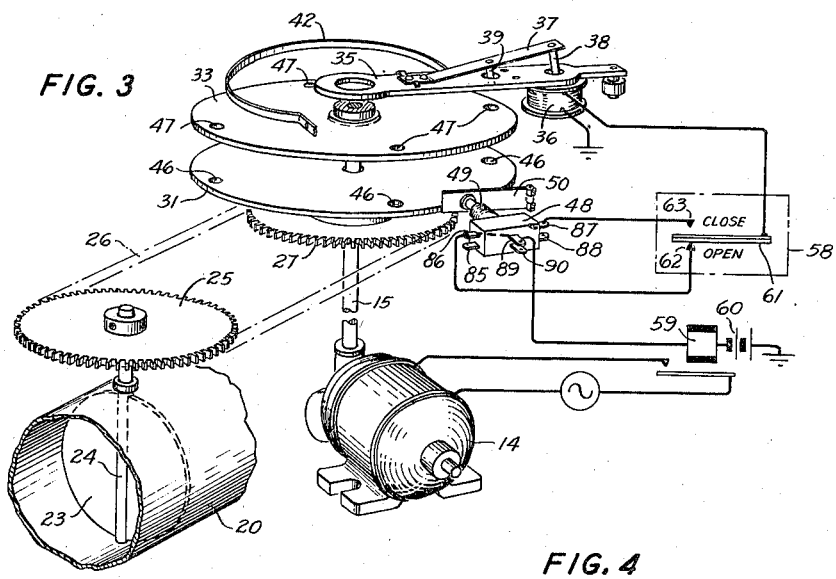
Fig. 3 is a view partly diagrammatic and partly exploded and in perspective, illustrating the association of one of the actuating members of the unit shown in Fig. 1 with the supply pipe or conduit for one room and illustrating also the control circuit for this actuating member.
Figure 4:
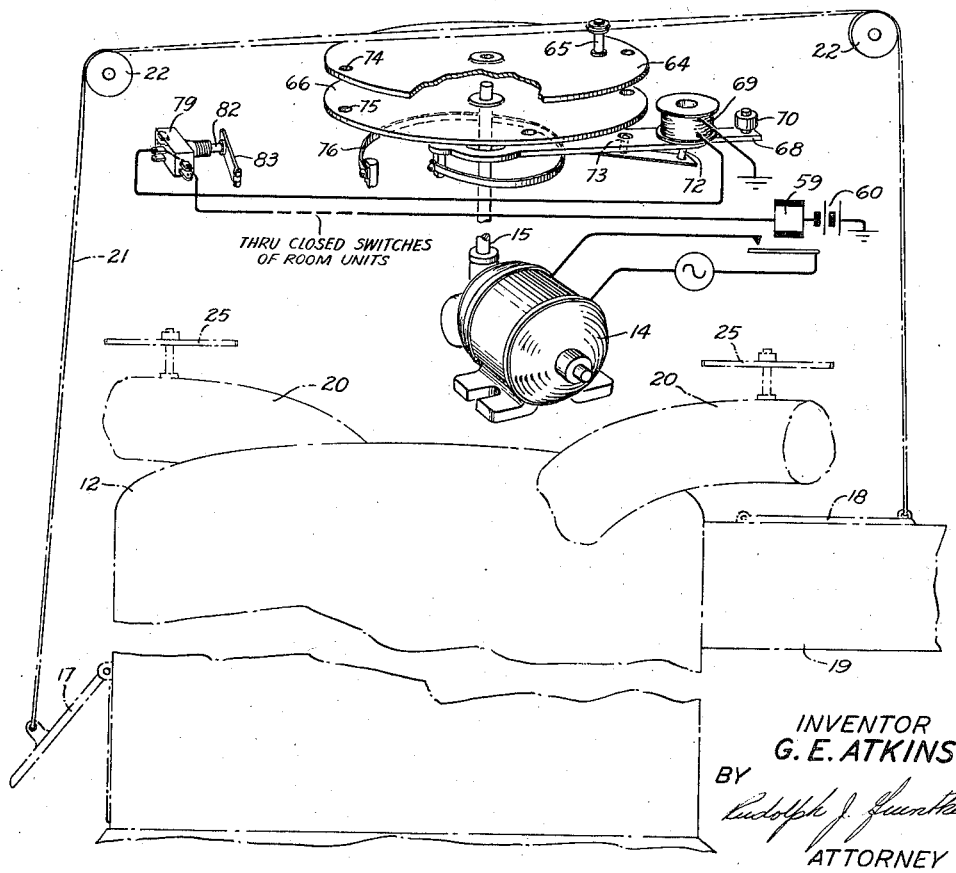
Fig. 4 is a view, also partly diagrammatic and partly exploded and in perspective, illustrating the association of one of the actuating members with the heating plant, and showing also the control circuit for this actuating member.

As indicated in Fig. 4, the furnace 12 is provided with the usual draft 17 and check 18, the latter being mounted upon the flue 19, and is provided also with a plurality of pipes or conduits 20 which lead, for example, to registers or radiators in rooms of a dwelling. The draft 17 and check 18 are connected mechanically by a suitable cable 21, such as a chain, which passes over suitably mounted guides or pulleys 22. Each of the pipes or conduits 20 is provided with a valve such as a rotatable damper 23, shown clearly in Fig. 3, mounted on a shaft or rod 24 which has affixed thereto a suitable sprocket 25.

Each of the sprockets 25 is connected, as for example, by a chain 26, to a corresponding sprocket 27 loosely mounted upon the shaft 15, the chains 26 passing through suitable apertures 28 in the housing 10. The several sprockets 27 are affixed, as by screws 29, to hubs 30 of corresponding discs 31 also loosely mounted on the shaft 15. The sprockets 27 and discs 31 are held in proper position upon the shaft 15 by suitable members such as collars 32 secured to the shaft 15. Disposed adjacent each of the loosely mounted discs 31 is a driving disc 33 having a hub 34 suitably secured to the drive shaft 15.

Adjacent each of the driving discs 33 is a strip member or arm 35 which is positioned on the corresponding hub 34, as shown clearly in Fig. 1, and is freely rotatable thereabout. The strip members or arms 35 have mounted thereon a solenoid 36 and a resilient strip 37 which carries a magnetic stud or armature 38 and a pin or stud 39 extending through an aperture in the strip or arm 35. Leading in conductors 44 for the solenoids 36 extend along the arms 35 and thence to terminal blocks 45 mounted upon the housing 10, 11. Each of the arms 35 is provided with an extension or finger 40 carrying a roller 41, and has secured thereto a bowed or arcuate spring member 42 affixed at one end to a bracket 43 also mounted upon the housing 10, 11.

As shown clearly in Fig. 3, the corresponding discs 31 and 33 are provided with cooperatively disposed apertures 46 and 47, respectively, arranged adjacent the peripheries of the discs and at intervals of 90 degrees, the apertures 46 and 47 being adapted to receive the studs or pins 39.

As will be apparent, when one of the solenoids 36 is energized, the corresponding stud or armature 38 is drawn into the solenoid so that the associated pin or stud 39 is inserted into corresponding apertures 46 and 47 in the discs 31 and 33 respectively. Consequently, the corresponding arm 35 and discs 31 and 33 are coupled together whereby they may be revolved as a unit.

For purposes of illustration, it will be assumed that with the arm 35, disc 33 and sprocket 27 in the position indicated in Fig. 2, the corresponding damper 23 is in the position indicated in Fig. 3, namely the closed position. If the motor 14 and solenoid 36 are energized, the corresponding discs 31 and 33, the sprocket 26 and the arm will revolve clockwise through 90 degrees against the action of the spring 42 so that the damper 23 also will rotate 90 degrees to its open position. Upon de-energization of the solenoid 36, in a manner to be described hereinafter, the armature 38 will be raised and the loose disc 31 uncoupled from the driving disc 33. Consequently, the spring 42 will revolve the arm 35 90 degrees in a counterclockwise direction. If the solenoid 36 is again energized, the disc 31 and sprocket 27 will be coupled again to the corresponding driving disc 33, and the sprocket 27 will be revolved another 90 degrees clockwise so that the associated damper 23 will be rotated to its closed position. Upon each subsequent energization of the solenoid 36, the corresponding damper 23 will be rotated 90 degrees clockwise.

Associated with each arm 35 is a double pole double throw switch 48 mounted upon the arcuate portion 11 of the housing. The push button 49 as shown in Fig. 2, is engaged by a guide member 50 pivoted upon the housing and connected thereto by a spring 51. The switch 48 is of generally standard construction and of the type wherein two circuits are connected alternately to an input line by successive depressions of the push button 49. Each switch is actuated by the engagement of the guide member 50 by the roller 41 on the corresponding arm 35 and is provided with six contacts 85 to 90 inclusive.

The switches 48 and solenoids 36 are connected in circuit with a corresponding temperature responsive device 58, such as a thermostat, a relay 59, and source of E. M. F. such as a battery 60, as described in detail hereinafter. The thermostat, as shown, is provided with a contact blade 61, an "open" contact 62, and a "close" contact 63. The thermostat may be adjusted or set, of course, so that the temperature change necessary to change the blade 61 from engagement with contact 62 to engagement with contact 63 corresponds to any desired range of temperatures desired.

The draft 17 and check 18 are controllable by a mechanism similar to that described heretofore for the several dampers 23. Referring particularly to Figs. 1 and 4, it will be seen that a disc 64 is loosely mounted upon the disc 66 secured to the shaft 15 and having a hub 67 about which an arm 68 is rotatable. The arm 68 carries a solenoid 69, a roller 70 and a resilient member 71. Mounted upon the resilient member 71 are an armature 72, adapted to be drawn into the solenoid 69, and a pin 73, adapted to extend into aligned apertures 74 and 75 in the driven disc 64 and driving disc 66 respectively. As shown in Fig. 4, the apertures 74 and 75 in the discs 64 and 66 respectively are diametrically opposite. The arm 68 has affixed thereto a bowed or arcuate spring 76 which is secured at one end to a stud 77 carried by a bracket 78 mounted upon the housing 10, the spring 76 being stressed by clockwise rotation of the arm 68. Mounted upon the bracket 78 is a double pole double throw push switch 79, having contacts 80 and 81 and a push button 82, the latter being engaged by a guide arm or member 83 pivoted upon the bracket 78. The guide arm or member 83 is adapted to be engaged by the roller 70 whereby the switch 79 is operated.

When the various elements are in the position shown in Fig. 4, that is the draft open and the check closed, and the solenoid 69 is energized, the driven disc 64 is coupled to the driving disc 66 and the two discs rotated through 180 degrees clockwise whereby the draft is closed and the check opened. When the discs have been thus rotated, the energizing circuit for the solenoid 69 is opened by the switch 79, as described more fully hereinafter, the discs and arms 68 are uncoupled, and the arm 68 rotated 180 degrees clockwise by the spring 76. Upon subsequent energization of the solenoid, the discs and arms will be coupled again and the disc 64 rotated another 180 degrees clockwise so that the draft 17 will be opened and the check 18 closed.

It will be seen from the foregoing that this invention provides an apparatus and system wherein not only is the delivery of conditioned air to each of a plurality of rooms or the like automatically controlled by a temperature responsive device but also the heating or cooling plant is controllable from a remote point. In addition, as will appear from the following, the invention provides a control system wherein the central plant, such as the furnace, is controlled automatically so that when all of the rooms supplied by the central plant are at the desired temperature, the plant is shut off. Consequently a low fuel consumption and high operating economy are effected.

The control system in accordance with this invention will be understood clearly from Fig. 5 which illustrates a system embracing three rooms, A, B, and C, supplied from a central plant. At each room there is located a thermostat 58 each of which is associated with a corresponding switch 48 and solenoid 36, the corresponding switches, solenoids and thermostats being indicated by corresponding letters after the identifying numerals. Fig. 5 represents the conditions when the damper 23 in the pipe to room C is in its closed position, the room being at or above the desired temperature, and the damper in the pipe to room B is in its open position, the room B being below the desired temperature. The energizing circuits for the solenoids 36B and 36C, therefore, are open.

As to room A, Fig. 5 shows conditions at the time the damper in the pipe to this room is in its closed position and the temperature in room A has reached the desired degree. Therefore, the contact blade 61 of thermostat 58A has just come into engagement with the close contact 63 of this thermostat and a circuit is closed from ground through battery 60, relay 59, contacts 89 and 87 of switch 48A, and solenoid 36A. Closing of this circuit energizes relay 59 so that the motor 14 is connected to the source 100 and the shaft 15 revolves. Simultaneously disc 31A corresponding to room A is coupled to its driving disc 33A, and the two rotate 90 degrees clockwise whereby the damper 23A in the pipe to room A is rotated to its closed position. When the discs have thus revolved 90 degrees the rotatable arm 35A associated therewith operates switch 48A so that it is thrown to its closed position as designated in Fig. 5. Thereby the energization circuit through relay 59 and solenoid 36A is interrupted and the relay 59 releases to open the line circuit for the motor 14. Likewise the solenoid 36A is deenergized so that the driven disc 31A is uncoupled from the driving disc 33A and arm 35A and the arm is revolved 90 degrees counterclockwise by the spring 42A.

When the temperature in room B rises to that desired, the contact blade 61 of the thermostat 58A will move toward and engage the close contact 63 of this thermostat and the solenoid 36B becomes energized through the circuit including this solenoid, contact 63 of thermostat 58B, contacts 87 and 89 of switch 48B and relay 59 and source 60. Closing of this circuit will result in rotation of the damper 23 in the pipe for room B 90 degrees clockwise to its closed position and throwing of switch 48B to its closed position.

When all of the rooms A, B and C are at the desired temperature it is desirable, of course, that the rate of fuel consumption by the furnace be decreased. This desiderata is obtained in systems in accordance with this invention for when all of the rooms are at or above the desired temperature, the control mechanism for the furnace is actuated to close the draft and open the check. Specifically, it will be seen from Fig. 5 that when all rooms are at the desired temperature, each of switches 48A, 48B and 48C is in its closed position. A circuit is thus completed through battery 60, relay 59, contacts 90 and 85 of switch 48C, contacts 90 and 85 of switch 48B, contacts 90 and 85 of switch 48A, contacts 91 and 93 of switch 79, and solenoid 69. Completion of this circuit results in energization of the motor 14 and rotation of the shaft 15. Simultaneously the solenoid 69 is energized so that disc 64 is coupled to disc 66 and the two discs and arm 68 rotated clockwise 180 degrees whereby the draft 17 will be closed and check 18 opened. When the discs 64 and 66 have thus rotated, switch 79 is thrown to its closed position by engagement of the roller 70 with the guide 83 and consequent depression of the plunger 82. Such operation of the switch 79 opens the circuit heretofore traced so that the relay 59 and solenoid 69 are deenergized. Release of relay 59, of course, interrupts the line to the motor 14 and rotation of the discs ceases. Deenergization of solenoid 69 results in uncoupling of the disc 64 from the disc 66 and the arm 68, and the arm 68 is thereupon revolved 180 degrees counterclockwise by the spring 76.

When the temperature in any room falls the draft is again opened and the check closed. For example, assume that the temperature in room C falls below the minimum set. Contact blade 61 of thermostat 58C will move toward and engage contact 62 of this thermostat and the solenoid 36C and relay 59 are energized through a circuit including battery 60, relay 59, contacts 89 and 86 of switch 48C, contact 62 of thermostat 58C and solenoid 36C. As a result, as will be clear from the detailed description hereinabove, the damper for room C will be rotated to its open position and switch 48C will be thrown to its opened position. Such operation of the switch 48C will close a circuit through solenoid 69, contacts 93 and 80 of switch 79, contacts 88 and 90 of switch 48C, relay 59 and source 60. Upon completion of this circuit, as will be clear from the description heretofore, the disc 64 will be rotated 180 degrees clockwise to open the draft 17 and close the check 18.

Similarly, if room B is the one in which the temperature falls, the contact blade 61 of thermostat 58B will engage the open contact 62. Consequently the solenoid 69 will be energized through an obvious circuit including contacts 88 and 90 of switch 48B, contacts 85 and 90 of switch 48C, and the source 60. As a result, the draft 17 of the furnace will be opened and the rate of combustion in the furnace increased to quickly supply highly heated air to room B.

Likewise, if room A is the one in which the temperature falls, the draft for the furnace will be opened. In this case, the solenoid 69 is energized through a circuit including contacts 80 and 93 of switch 79, contacts 88 and 90 of switch 48A, contacts 85 and 90 of switches 48B and 48C and source 60.

It will be apparent, of course, that whenever the temperature of any room has fallen sufficiently to result in opening of the furnace draft as described heretofore, the solenoid 69 does not become energized when the temperature in other rooms falls below that desired. The solenoid 69 remains deenergized until, as pointed out heretofore, all of the rooms are at a desired temperature whereupon energization of the solenoid 69 occurs and closing of the draft 17 results.

Although the invention has been described hereinabove in a heating system including a hot air furnace, it will be understood, of course, that it may be utilized in a heating system of the hot air type including an oil burner. In such application, as indicated in Fig. 5, the oil burner motor may be connected in series with the source 91 through the contacts 92 and 94 of switch 79, being in circuit when any of the rooms is below the desired temperature and out of circuit when all of the rooms are at or above the desired temperature.

The invention may be used to advantage also in cooling systems. Such systems, as illustrated in Fig. 6 may include a control chamber 95 into which air may be forced as by a fan, not shown. The chamber 95 is provided with a plurality of pipes or conduits 96, only one of which is shown, in each of which there is a rotatable damper 23. The damper 23 may be rotated by the same mechanism and control system as the damper 23 in Fig. 3.

The air forced into the chamber 95 is passed over a radiator 97 which may be composed of number of tubes connected at one end to an outlet pipe 98 and at the other end to an inlet pipe 99 and may have a suitable cooling medium circulated therethrough. The tubes of the radiator may have a flat spiral ribbon secured thereto edgewise in order to increase the heat absorbing surface thereof. The control circuit for the cooling system will be the same as that illustrated in Fig. 5 except that the connections to the thermostats will be reversed so that the various dampers will be in the open position when the temperature of a room rises above a certain temperature and will be in the closed position when the temperature falls below the lowest desired. The fan for forcing air into the chamber 95 may be connected in circuit with the source 91 through contacts 92 and 94 of switch 79, Fig. 5, the arrangement being such, of course, that the fan is rendered inactive when all of the rooms are at at least a desired low temperature.

It may be pointed out also that the structure illustrated in Fig. 6 may be used in a heating system in which case a heating medium is circulated through the radiator 97.

Although the invention has been described hereinabove with reference to a system wherein heated or cooled air is supplied from a control plant to a plurality of points, it will be clear, of course, that it may be utilized also in hot water, steam or vapor systems. In such cases the various valves 23 would be operable to control the flow of steam, hot water or vapor from the central plant to the radiators located at desired points.

Furthermore, although a control system and apparatus for three rooms have been described, the invention may be practiced in systems for a greater or lesser number of rooms.

It will be understood also that the invention may be utilized in humidifying systems in which case humidostats would be employed in place of the thermostats.

Finally, it will be understood, of course, that although specific embodiments of the invention have been shown and described, various modifications may be made therein without departing from the scope and spirit of this invention as defined in the appended claims.

What is claimed is:

1. In a heating system including a hot air furnace having a draft and check, pipes extending from said furnace for distributing heated air to a plurality of rooms, a damper in each of said pipes, a single driving member, means for coupling each of said dampers to said driving member, means including a thermostat in each of said rooms for operating said coupling, a rotatable member connected to said draft and said check, means for coupling said rotatable member to said driving member, and means controlled by said operating means for actuating said second coupling means when all of said rooms are at or above desired temperatures.

2. In a conditioned fluid system including a source of conditioned fluid, a plurality of conduits for distributing conditioned fluid from said source to a plurality of points, and a valve in each of said conduits, a control apparatus comprising a shaft, means for revolving said shaft, driving members affixed to said shaft, driven members loosely mounted on said shaft and each coupled to one of said valves, a plurality of clutches each adapted to couple one of said driven members to the corresponding driving member, and means including thermostats at each of said points for controlling said clutches whereby said valves are actuated in accordance with temperature variations at said points to control the flow of conditioned fluid individually to said points.

3. In a conditioned air system including a plant for producing conditioned air, control means for said plant, a pipe for conveying conditioned air from said plant, and a valve in said pipe, regulating apparatus comprising a pair of driving members, common means for actuating said members, a pair of driven members one cooperatively related with each of said driving members, means coupling one of said driven members to said valve, means coupling the other of said driven members to said control means, means for coupling each of said driven members to the corresponding driving member, a control system including a thermostat for actuating said coupling means, and means controlled by said control system for energizing said common means when said coupling means are actuated.

4. In a conditioned air system including a plant for producing conditioned air, means for regulating the rate of production of conditioned air at said plant, a plurality of pipes for conveying conditioned air from said plant to a plurality of rooms, and a valve in each of said pipes, a regulating system comprising a plurality of driven members each coupled to one of said valves, a driven member coupled to said regulating means, a plurality of driving members, each associated with a corresponding one of said driven members, means for actuating said driving members, a plurality of electro-magnetically operable clutches each adapted to couple one of said driven members to the corresponding driving member, and a control system including a source of E. M. F., a thermostat at each of said rooms, each thermostat being electrically associated with said source and a corresponding one of said clutches for said plurality of driven members, and means for electrically connecting the clutch for the regulating means driving and driven members in circuit with said source and said thermostats, and means for energizing said actuating means in response to actuation of any of said clutches.

5. In a conditioned air system including a central plant for producing conditioned air, a plurality of pipes for distributing conditioned air from said plant to a plurality of rooms, means for regulating said plant, and a valve in each of said pipes, a control system including a shaft, means for rotating said shaft, a plurality of driven discs mounted loosely on said shaft and each coupled to a corresponding one of said valves, a driven disc mounted on said shaft and coupled to said regulating means, means for rotating said shaft, means for coupling each of said discs to said shaft, a control system including a thermostat at each of said rooms for actuating said coupling means whereby said first discs are coupled individually to said driving means, and means associated with said thermostats for selectively coupling said second driven disc to said driving means.

6. In a conditioned air system including a central plant for producing conditioned air, a plurality of pipes for distributing conditioned air from said plant to a plurality of rooms, control means for said plant, and a valve in each of said pipes, regulating apparatus including a power means, actuating members for said valves, an actuating member for said control means, means including a plurality of thermostats disposed one in each of the rooms for connecting said first actuating members individually to said power means whereby said valves are actuated individually to increase and decrease the flow of air to said rooms in accordance with variations in the temperatures of said rooms, and means controlled by said thermostats and operable when all of said rooms are at desired temperatures to couple said second actuating member to said power means whereby said control means is operated to render said plant substantially inoperative.

7. In a regulating system including a source of conditioned fluid, a conduit for conveying conditioned fluid from said source to a room, and a valve in said conduit, means for actuating said valve comprising a rotatable member coupled to said valve, driving means for said member including a motor, a supply circuit for said motor including a switch, an electrically operated clutch for coupling said driving means to said member, an energizing circuit for said clutch including a thermostat at said room, a relay for operating said switch, and another switch, and a member adapted to be coupled to said driving means by said clutch for actuating said second switch when said member has rotated through a predetermined arc, to open said energizing circuit.

8. In a regulating system including a source of conditioned fluid, a conduit for conveying fluid from said source to a room, and a valve in said conduit, regulating apparatus comprising a shaft, means for revolving said shaft, a disc affixed to said shaft, a driven disc loosely mounted on said shaft, said discs having corresponding apertures therein, means coupling said driven disc to said valve, clutch means for coupling said discs together including a member mounted on said shaft, a pin resiliently mounted on said member and adapted to extend into corresponding apertures in said discs, electrically operated means for inserting said pin into said corresponding apertures, and a control circuit for said electrically operated means including circuit controlling means in said room.

9. In a conditioned air system including a source of conditioned air, a conduit for conveying air from said source to a room, and a valve in said conduit, means for operating said valve comprising a shaft, means for revolving said shaft, a driven disc loosely mounted on said shaft and coupled to said valve, a driving disc adjacent said driven disc and affixed to said shaft, said discs having juxtaposed angularly spaced apertures, an arm member loosely mounted on said shaft, a retractile spring coupled to said arm member and adapted to be stressed by rotation thereof in one direction, a pin resiliently mounted on said arm member and adapted to be inserted into corresponding of said apertures, means including a solenoid for inserting said pin into said corresponding apertures, and a control circuit for said solenoid including a thermostat and a switch, said switch being mounted in the path of travel of said arm and actuable when engaged by said arm to open said circuit whereby said solenoid is deenergized and said pin is withdrawn from said apertures.

10. In a temperature regulating system comprising a central plant, a plurality of pipes extending from said plant to a plurality of points and a valve in each of said pipes, means for actuating said valves comprising a plurality of rotatable members each coupled to one of said valves, common driving means for revolving said members, a plurality of electric clutches for individually coupling said members to said driving means, and control means for said clutches including a thermostat at each of said points, one in circuit with each of said clutches, a source of E. M. F. and a plurality of switches each in circuit with said source and a corresponding one of said thermostats, said switches being operable in response to the rotation of said rotatable members through predetermined arcs to open and close alternately the circuits in which they are included.

11. In a conditioned air system, a central plant, a plurality of pipes for conveying air from said plant to a plurality of rooms, and a valve in each of said pipes, means for actuating said valves comprising a plurality of rotatable members each coupled to one of said valves, a common driving means for said members, a plurality of clutches for coupling said members individually to said driving means, a control means including a plurality of thermostats disposed one at each room for individually actuating said clutches in response to temperature variations at said rooms, and means controlled by said control means for actuating said driving means whenever any one of said rooms is at other than a predetermined temperature.

12. In a conditioned air system including a plant for producing conditioned air, a conduit for conveying conditioned air from said plant to a point removed therefrom, a rotatable damper in said conduit, and rotatable means at said plant for controlling the rate of production of conditioned air thereby, regulating means comprising a motor, an energizing circuit for said motor, a shaft coupled to said motor, means for connecting said damper and said rotatable means individually to said shaft, means including a control element at said point for actuating said connecting means, and means responsive to operation of said actuating means for controlling said energizing circuit.

13. A conditioned fluid system comprising a plant for producing conditioned fluid, a control member at said plant, and regulating means including a shaft, a rotatable member loosely mounted on said shaft and coupled to said control member, driving means for revolving said shaft in one direction, a second rotatable member loosely mounted on said shaft, a clutch carried by said second rotatable member for coupling both said rotatable members to said shaft, control means for actuating said clutch, and means responsive to rotation of said rotatable members through a predetermined arc in said one direction to release said clutch.

14. A conditioned fluid system comprising a plant for producing conditioned fluid, a control member at said plant, and regulating means including a rotatable member coupled to said control member, driving means for revolving said rotatable member in one direction, a second rotatable member, a clutch carried by said second rotatable member for coupling both said rotatable members to said driving means, control means for actuating said clutch, means responsive to rotation of said rotatable members through a predetermined arc in said one direction to release said clutch, and means operable upon release of said clutch to rotate said second rotatable member through an equivalent arc in the opposite direction.

15. A conditioned fluid system comprising a plant for producing conditioned fluid, a control member at said plant, and regulating means including a rotatable member coupled to said control member, driving means for revolving said rotatable member in one direction, a second rotatable member, a clutch carried by said second rotatable member for coupling both said rotatable members to said driving means, control means for actuating said clutch, means responsive to rotation of said rotatable members through a predetermined arc in said one direction to release said clutch, and means actuable by said clutch control means for energizing said driving means.

16. A conditioned fluid system comprising a plant for producing conditioned fluid, a control member at said plant, and regulating means including a rotatable member coupled to said control member, driving means for revolving said rotatable member in one direction, a second rotatable member, a clutch carried by said second rotatable member for coupling both said rotatable members to said driving means, control means for actuating said clutch, means responsive to rotation of said rotatable members through a predetermined arc in said one direction to release said clutch, means actuable by said clutch control means for energizing said driving means, and means responsive to rotation of said rotatable members through said predetermined arc to deenergize said driving means.

17. In a regulating system including a source of conditioned fluid, a conduit for conveying fluid from said source to a room, and a valve in said conduit, regulating apparatus comprising a shaft, means for revolving said shaft, a driving member affixed to said shaft, a driven member loosely mounted on said shaft adjacent said driving member and having an aperture therein, means coupling said driven member to said valve, clutch means for coupling said driving and driven members including a third member mounted on said shaft, a pin resiliently mounted on said third member and adapted to extend through said aperture and to engage said driving member, electrically operated means for inserting said pin through said aperture, and a control circuit for said electrically operated means including circuit controlling means at said room.

GEORGE E. ATKINS.